United States Patent [19]

Durham

[11] 4,324,114
[45] Apr. 13, 1982

[54] MOVEABLE JOINT SEAL
[75] Inventor: Donald F. Durham, Peoria, Ill.
[73] Assignee: Caterpillar Tractor Co., Peoria, Ill.
[21] Appl. No.: 197,079
[22] Filed: Oct. 15, 1980

Related U.S. Application Data

[63] Continuation of Ser. No. 38,986, Feb. 26, 1979, abandoned.

[51] Int. Cl.³ .............................................. F16D 3/26
[52] U.S. Cl. .................................. 64/17 A; 308/187.1; 308/187.2; 277/92; 277/83; 277/165
[58] Field of Search ............................ 64/17 A, 17 R; 308/187.1, 187.2; 305/11; 277/92, 83, 235 R, 165

[56] References Cited

U.S. PATENT DOCUMENTS

| | | | |
|---|---|---|---|
| 2,027,078 | 1/1936 | Warner | 64/17 A |
| 2,114,199 | 4/1938 | Wollner | 64/17 A |
| 2,124,803 | 7/1938 | Wollner | 64/17 A |
| 2,209,855 | 7/1940 | Slaght | 64/17 A |
| 2,285,623 | 6/1942 | Swenson et al. | 64/17 A |
| 2,338,169 | 1/1944 | Dunn | 64/17 A |
| 2,427,449 | 9/1947 | Dunn | 64/17 A |
| 2,577,692 | 12/1951 | Slaght | 64/17 A |
| 2,773,367 | 12/1956 | Slaght | 64/17 A |
| 3,200,615 | 8/1965 | Stokely | 64/17 A |

FOREIGN PATENT DOCUMENTS 540075 12/1976 U.S.S.R. ............................ 64/17 A

Primary Examiner—Charles J. Myhre
Assistant Examiner—Magdalen Moy
Attorney, Agent, or Firm—Wegner, Stellman, McCord, Wood & Dalton

[57] ABSTRACT

An improved seal (10) for use in a universal joint (11) having an elastic seal ring (23) compressed between a pair of right circularly cylindrical sleeves (24,25). The seal ring is bonded to the sleeves. The sleeves are adapted to have press-fitted relationship with association portions of the universal joint, such as the journal trunnion (12) and the bearing retainer (14). In one form, the elongated extent of the sleeves is parallel to the axis (15) of the journal trunnion (12) and in a modified form, the sleeves (124,125) extend perpendicularly thereto. In each form, a portion of one of the sleeves is disposed adjacent the inner end of the needle bearings (22,122) so as to limit axial movement thereof. The sleeves are bonded to the seal ring so as to preclude sliding movement therebetween while yet permitting limited axial play in the universal joint thereby to provide long troublefree life of the seal.

17 Claims, 2 Drawing Figures 4,324,114

MOVEABLE JOINT SEAL

This is a continuation, of application Ser. No. 38,986 filed Feb. 26, 1979 now abandoned.

TECHNICAL FIELD

This invention relates to movable joint seals and in particular to seals as for use in universal joints and the like.

BACKGROUND ART

In U.S. Pat. No. 3,218,107 of Harold L. Reinsma, which patent is owned by the assignee hereof, a seal and coupling assembly for a hinge joint is illustrated comprised of an inner sleeve member, an outer sleeve member and an intermediate elastic ring member securely maintained therebetween. One of the sleeves is press-fitted onto a track pin and the other of the sleeves is press-fitted into a track link with the seal being adapted to permit limited pivotal movement along the longitudinal axis of the pin.

In U.S. Pat. No. 2,338,169, George E. Dunn shows a universal ball joint having another form of seal for retaining lubricant within the bearing and preventing the entry of dirt and other foreign matter into the bearing assembly.

Another seal for use in a track for a tractor is illustrated in British Pat. No. 1,425,364 of the Kabushiki Kaisha Komatsu Seisakusho Japanese company. In that patent, a dust seal is illustrated having the shape of a W or a compound W so as to be capable of withstanding a thrust exerted on the bushing in the axial direction of the track pin.

DISCLOSURE OF INVENTION

The present invention comprehends an improved universal joint seal formed of an elastic seal ring captured between first and second right circularly cylindrical annular sleeves bonded to diametrically opposite portions thereof. The sleeves place the seal ring under compressive stress and are arranged to be press-fitted into the confronting portions of the universal joint structure.

In the illustrated embodiment, the angular surfaces abutted by the sleeves are disposed right angularly to each other.

One of the universal joint elements may be provided with a recess having an inner portion defining a surface against which one of the sleeves abuts, the width of the recess being preselected to have the ends of the sleeve in abutment therewith to prevent axial movement of the sleeve.

More specifically, the universal joint seal journaled trunnion may be provided with an annular collar defining the recess.

In the illustrated embodiment, the seal ring is formed of rubber and the sleeves are formed of rigid metal.

The universal joint seal structure of the present invention is extremely simple and economical of construction while yet providing an improved lubricant retaining means and means for preventing ingress of foreign matter into the universal joint bearing structure.

BEST MODE FOR CARRYING OUT THE INVENTION

Figure 1:
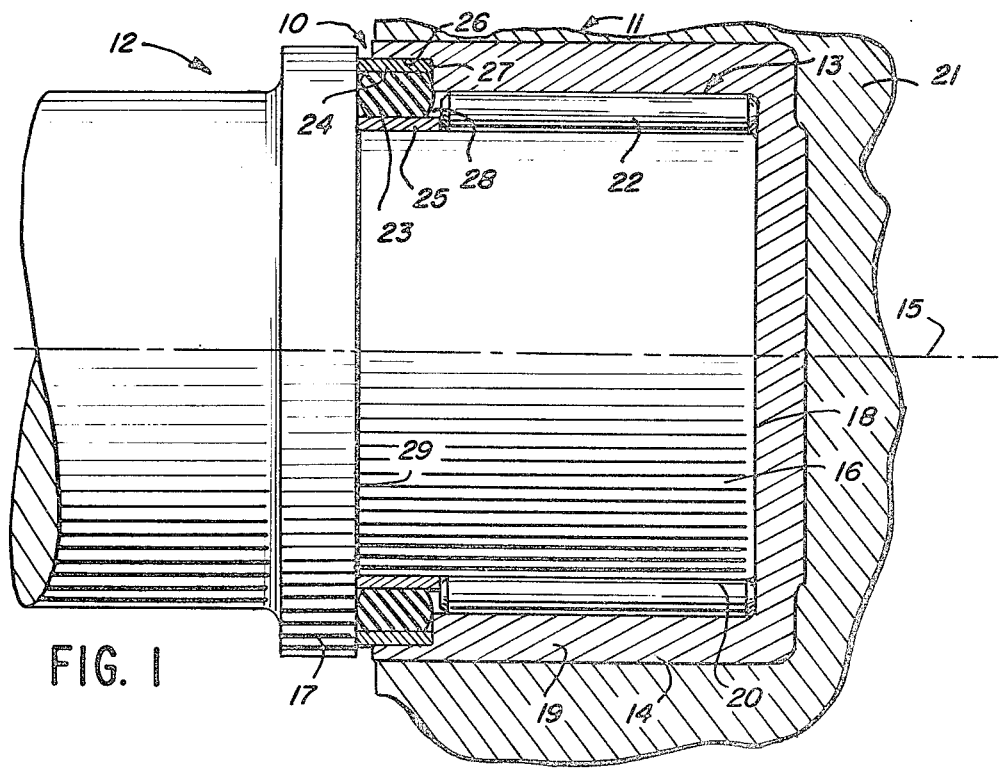
FIG. 1 is a fragmentary diametric section of a universal joint structure provided with an improved seal assembly embodying the invention.

In the exemplary embodiment of the invention as disclosed in the drawing, an improved seal generally designated 10 is shown for use in a universal joint generally designated 11 having a journal trunnion 12 and an annular bearing means generally designated 13 received in an annular bearing cap retainer 14.

The journal trunnion 12 defines a rotation axis 15. The distal end 16 of the journal trunnion may be provided with an annular collar 17 spaced from the end surface 18 thereof. The cap retainer 14 embraces the distal end 16 with the bearing assembly 13 disposed between the cylindrical sidewall 19 of the cap retainer and the periphery 20 of the journal trunnion portion 16.

As illustrated in FIG. 1, the cap retainer may be press-fitted into the cross portion 21 of the universal joint 11 in the conventional manner. It is desirable to maintain lubrication of the bearing means 13 which, in the illustrated embodiment, comprises a plurality of needle bearings 22 in an annular array around journal trunnion surface 20 within the retainer cap. As indicated above, seal 10 is provided to effect such desirable retention of the lubricant and prevent entry of dirt and other foreign matter into the bearing.

As illustrated in FIG. 1, the present invention comprehends an improved seal 10 having an elastic seal ring 23 and diametrically opposed, right circularly cylindrical annular sleeves 24 and 25 bonded to diametrically opposite portions of the seal ring. The inner diameter of the first sleeve 24 and the outer diameter of the second sleeve 25 are preselected to provide a desired preloading of the seal ring 23, as illustrated in FIG. 1. Sleeve 24 is press-fitted into a notch 26 in the outer end of retainer portion 19, and sleeve 25 is press-fitted onto the cylindrical surface 20 of the journal trunnion portion 16.

As shown in FIG. 1, sleeve 25 may define means for retaining the needle bearings 22 against axial displacement in the operation of the universal joint by the abutment of the sleeve with the collar 17 and the inner end of the bearings 22.

As further illustrated in FIG. 1, the outer sleeve 24 may be captured between the collar outer surface 29 and the radial surface 27 at the outer end of the recess 26.

As further seen in FIG. 1, a space 28 is provided between the inner end of the needle bearings 22 and the seal ring 23 so as to prevent wear and assure long troublefree life of the seal means.

The seal means 10 further provides improved trouble-free life in the arrangement which eliminates sliding surfaces between the seal ring 23 and the confronting portions of the joint. The seal means provides for limited axial endplay of the journal trunnion without adversely affecting the sealing effect of ring 23. As the seal ring is bonded to the sleeves 24 and 25, the seal ring effectively eliminates wearing surfaces relative to such axial play of the journal trunnion.

Figure 2:
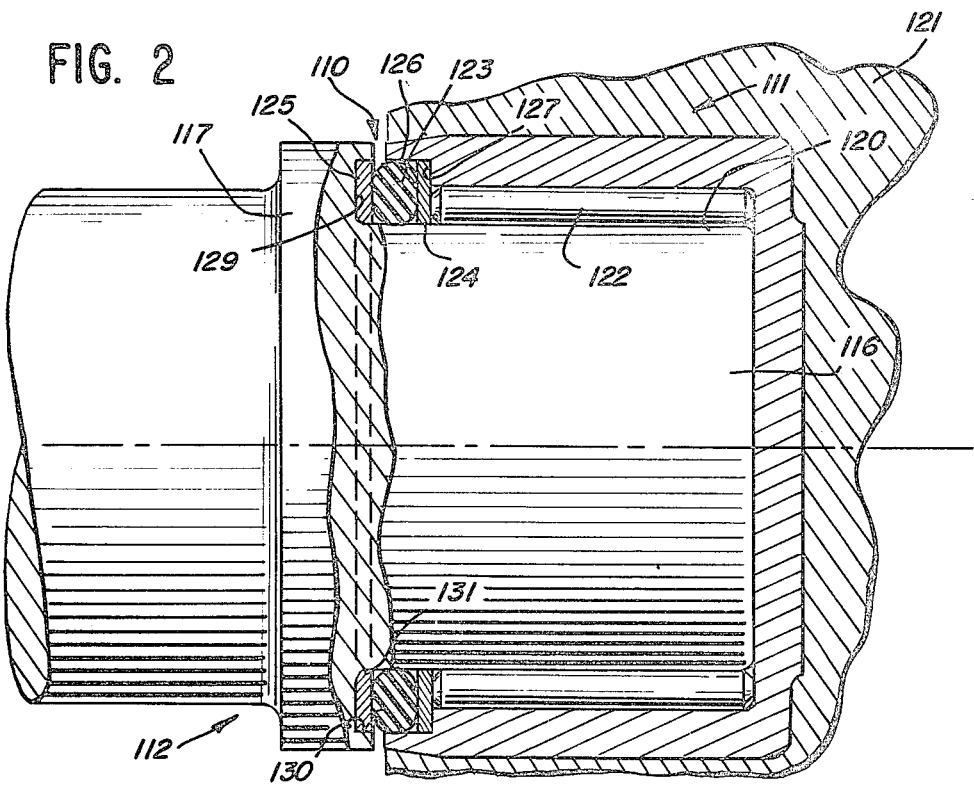
FIG. 2 is a fragmentary diametric section similar to that of FIG. 1 but illustrating a modified form of seal embodying the invention.

The invention further comprehends the arrangement of the seal in a second form, as illustrated in FIG. 2. As shown therein, a modified form of seal generally designated 110 is shown to comprise a seal generally similar to that of seal 10 but wherein the sleeves 124 and 125 are disposed perpendicularly to the arrangement of seal 10.

More specifically, sleeve 124 is disposed at the diametric outer portion of the seal ring 123 and sleeve 125 is disposed at the diametric inner portions thereof. Thus, the seal ring 123 is captured therebetween so as to have sealing engagement with the cylindrical surface of the recess 126 and sleeve 124 is urged against the outer annular surface 127 of the recess.

As further shown in FIG. 2, sleeve 124 serves as means for retaining the needle bearings 122 against axial displacement.

Collar 117 of the joint assembly 111 of FIG. 2 is provided with an annular recess 129 which receives the sleeve 125. The radially outer cylindrical surface 130 and the radially inner surface 131 of the recess 129 are dimensioned so as to have abutment by the inner and outer surfaces of the sleeve 125, thereby effectively retaining sleeve 125 against displacement in the collar.

The outer surface of the sleeve 124 has a diameter preselected to be press-fitted in the recess 126 and the inner diameter of the sleeve 124 is preselected to be press-fitted onto the surface 120 of the journal trunnion portion 116.

Thus, the seal 110 is similar to seal 10 except for the modified arrangement thereof as discussed above. The seal functions in a similar manner in providing an improved retention of lubricant in the bearing space while preventing entry of foreign matter thereinto.

The seal ring 123, as indicated above, effectively seals between the retainer recess portion 126 and the journal trunnion surface 120 to provide the desirable lubricant retention and foreign matter ingress protection.

INDUSTRIAL APPLICABILITY

The improved seal of the present invention is adapted for use in universal joints providing a substantial improvement and troublefree long life over prior art structures utilizing lip and O-ring seal. The seal may be provided in the form of a cartridge having preselected preload and adapted for facilitated press fit into the universal joint structure as discussed above. This seal provides improved long troublefree life in permitting limited axial movement without surface movement of the seal ring relative to the sleeves bonded thereto.

Other aspects, objects and advantages of this invention can be obtained from a study of the drawings, the disclosure and the appended claims. The foregoing disclosure of specific embodiments is illustrative of the broad inventive concepts comprehended by the invention.

What is claimed is:

1. In a universal joint (11) having a journal trunnion (12) defining an axial of rotation (15) and being mounted for rotation about said axis by an axially outer annular bearing (13) in a bearing cap retainer (14), the bearing being retained against axially outward displacement by said retainer, an improved seal (10) for movably sealing the journal trunnion to the bearing retainer for maintaining bearing lubricant therein and prevent entry of foreign matter thereinto, said seal comprising:
    an elastic seal ring (23);
    first (24) and second (25) right circularly cylindrical annular sleeves bonded to diametrically opposite portions of the seal ring, the diameters of said sleeves being preselected to place said seal ring under compressive preload; and
    means on said journal trunnion and bearing retainer defining first and second pairs of confronting annular surfaces (20,26 and 29,27), said sleeves seating respectively against the annular surfaces (20,26) of said first pair and said seal ring sealingly engaging the annular surfaces (17,27) of said second pair, said bearing being retained against axially inward displacement by one of said sleeves.

2. The universal joint structure of claim 1 wherein said first and second pairs of annular surfaces (20,26 and 27,29) are disposed right angularly to each other.

3. The universal joint structure of claim 1 wherein said first and second pairs of annular surfaces (20,26 and 27,29) are disposed right angularly of each other, one of said pairs of annular surfaces (20,26) extending axially parallel to said journal trunnion axis (15).

4. The universal joint structure of claim 1 wherein said first and second pairs of annular surfaces (20,26 and 27,29) are disposed right angularly of each other, the annular surfaces (20,26) of said first pair extending axially parallel to said journal trunnion axis.

5. The universal joint structure of claim 1 wherein said first and second pairs of annular surfaces (20,26 and 27,29) are disposed right angularly of each other, the annular surfaces (27,29) of said second pair extending radially to said journal trunnion axis.

6. The universal joint structure of claim 1 wherein said seal ring (23) is formed of rubber.

7. The universal structure of claim 1 wherein said sleeves (24,25) are formed of metal.

8. The universal joint structure of claim 1 wherein said sleeves (24,25) are pressfitted to said annular surfaces (20,26) of the first pair.

9. The universal joint structure of claim 1 wherein said annular surfaces (27,29) of the second pair are disposed in abutting engagement with the ends of one of said sleeves (24) to retain said one sleeve against axial movement.

10. The universal joint structure of claim 1 wherein said journal trunnion (12) is provided with an annular collar (17) defining one of said annular surfaces (29).

11. The universal joint structure of claim 1 wherein said one sleeve retains the bearing in axially spaced relationship to said seal ring.

12. In a universal joint having a journal trunnion defining an axis of rotation and being mounted for rotation about said axis by an axially outer annular bearing in a bearing cap retainer, the bearing being retained against axially outward displacement by said retainer, an improved seal for movably sealing the journal trunnion to the bearing retainer for maintaining bearing lubricant therein and prevent entry of foreign matter thereinto, said seal comprising:
    an elastic seal ring;
    first and second annular sleeves having a substantially rectangular cross section, each defining at least one of a planar or cylindrical surface engaging diametrically opposite portions of the seal ring;
    means on said journal trunnion and bearing retainer defining first and second pairs of confronting annular surfaces, said sleeves seating respectively against the annular surfaces of said first pair and said seal ring sealingly engaging the annular surfaces of said second pair to retain said seal ring under compressive sealing load, said bearing being retained against axially inward displacement in axially spaced relationship to said seal ring by one of said sleeves.

13. The universal joint structure of claim 1 wherein one of said annular surfaces of the first pair being defined by an annular recess (129) having side surfaces (130,131), the sleeve (125) in engagement therewith being captured against axial displacement between said side surfaces (130,131).

14. The universal joint structure of claim 12 wherein said journal trunnion (112) is provided with an annular collar (117) defining an annular recess (129) having an inner surface defining one of said annular surfaces and further defining side surfaces (130,131), the sleeve (125) in engagement therewith being captured against axial displacement between said side surfaces (130,131).

15. The universal joint structure of claim 12 wherein said sleeves comprise right circularly cylindrical sleeves.

16. The universal joint structure of claim 12 wherein said sleeves comprise flat washerlike sleeves.

17. The universal joint structure of claim 12 wherein said sleeves comprise right circularly cylindrical sleeves, said one of said sleeves having an axial extent greater than that of the other.

* * * * *